Jan. 3, 1967 J. A. BALDWIN, JR 3,296,602

MAGNETIC MEMORY ELEMENT WITH NONDESTRUCTIVE READ-OUT

Filed Aug. 30, 1962

INVENTOR
J. A. BALDWIN, JR.
BY
Charles Scott Phelan
ATTORNEY 3,296,602
Patented Jan. 3, 1967

3,296,602

MAGNETIC MEMORY ELEMENT WITH NONDESTRUCTIVE READ-OUT

John A. Baldwin, Jr., Albuquerque, N. Mex., assignor to Bell Telephone Laboratories, Incorporated, New York, N.Y., a corporation of New York Filed Aug. 30, 1962, Ser. No. 220,508
7 Claims. (Cl. 340—174)

This invention relates to a new apparatus arrangement for operating magnetic storage elements such as are commonly used in data processing and computing systems.

In a number of information handling systems it is desirable to have semipermanent memory elements in which information may be stored, no cyclic regeneration of stored information is required, and yet the information is available for repeated utilization in electric circuits without destruction of the stored version. A memory element with such characteristics is usually said to be capable of nondestructive read-out. Normally memory elements that are capable of nondestructive read-out have at least an implied memory portion, an interrogation portion from which destructive read-out may be performed, and an operating cycle in which the stored information is transferred after read-out from the memory portion back into the interrogating portion.

In one prior art example of a magnetic storage element with nondestructive read-out capability, the element has contiguous portions with widely differing coercivities. Only the low coercivity portion is interrogated, and after interrogation the high coercivity portion exerts a sufficient magnetomotive force to write back the stored information. A memory circuit utilizing such a storage element is disclosed in the W. A. Barrett, Jr., Patent 3,067,408. Naturally, storage elements of this type require supplementary circuit arrangements of varying complexity for controlling the cycle of operations. In addition, some devices of this type impose restrictions on signal current magnitude margins since violation of such restrictions results in improper storage element operation.

It is therefore one object of the invention to simplify the circuit arrangements for a semipermanent magnetic memory element.

It is another object to eliminate some of the specialized control circuits and functions normally associated with semipermanent magnetic storage elements.

A further object is to improve memory elements with nondestructive read-out capabilities.

These and other objects of the invention are realized in one illustrative embodiment wherein a nonreciprocal permeability characteristic is induced in a first portion of a multipath, flux-limited, ferrite device having substantially retangular hysteresis characteristics in each of the magnetic paths thereof. Flux is repeatedly switched in alternating cycles in a different portion of the device so located that a relatively small proportion of the flux in the first portion is switched thereby. Flux changes in the first portions induce voltages in a sense circuit coupled thereto, and these voltages are found to have a configuration which is indicative of the polarity of the mentioned nonreciprocal permeability. However, such configuration remains substantially the same for repeated drive signal alterations with no rewrite operation being required.

It is one feature of the invention that information stored in a device of the type described is relatively immune to noise in the interrogation circuit since information stored therein is not erased by the interrogating operation.

It is another feature that current limiting in the drive circuit of the device is not required when the drive is applied through flux-limited magnetic paths of the device.

Still another feature of the invention is that nondestructive read-out from a magnetic storage element is accomplished by taking advantage of a unique waveform characteristic of voltage induced in a circuit that is coupled to a portion of a flux-limited device which has heretofore been considered to produce under such conditions no practical signal output.

Yet another feature of the invention is that bipolar, recurring signals are utilized to drive a magnetic element in such a way that output voltages having a unipolar characteristic are produced in an output circuit coupled to the device.

A more complete understanding of the invention may be obtained from the following detailed description when taken together with the appended claims and the attached drawing in which:

Figure 1:
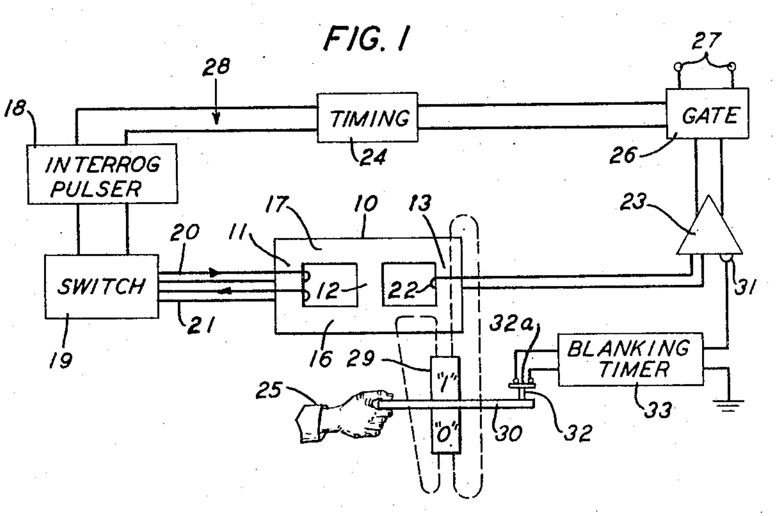
FIG. 1 is a diagrammatic representation of a magnetic storage circuit in accordance with the invention.

A three-rung laddic device 10 is illustrated in FIG. 1 and includes three rung portions 11, 12 and 13 interconnecting two side rail portions 16 and 17. All branches of the device 10 have substantially the same magnetic path cross sectional area. A rectangular hysteresis loop material is utilized for the device and may comprise, for example, any one of the well known ferrite materials. Details of the material composition and characteristics are not critical. An interrogation pulser 18 serves as the source of pulses for operating device 10 and supplies such pulses through a switch 19 which routes successive ones of the unipolar output pulses of pulser 18 alternately and with opposite polarities to the drive windings 20 and 21 which are coupled to rung 11 of device 10. Consequently rung 11 is subjected to recurring cycles of alternating magnetomotive force.

The device 10 will be recognized by those skilled in the art as a flux-limited magnetic device, i.e., the maximum switchable flux is the same for all rungs and rails so the complete switching of one rung or rail cannot result in the complete switching of more than one additional one. Pulses applied to windings 20 and 21 are the pulses 36 and 37, respectively, in FIG. 2 and are of sufficient magnitude to switch substantially all of the flux in rung 11. However, since device 10 is a flux-limited device, the greater portion of the return path flux for rung 11 is switched around the aperture defined by rungs 11 and 12 and the interconnecting portions of rails 16 and 17. It is known that in addition a relatively small amount of flux is switched in rung 13 each time that the flux in rung 11 is switched, and the relative amount of flux switched in rungs 12 and 13 are dependent upon a number of factors, including the relative magnitudes of the permeabilities and lengths of the two branches. With this in mind we can now define the required magnitude of pulses from pulser 18 as being sufficient to switch flux around both apertures of device 10, i.e., switching flux in rung 11 with the consequent switching of at least some flux in each of the rungs 12 and 13. A sense winding 22 is coupled to rung 13 for for detecting flux polarity changes therein. Winding 22 is coupled to one input of an amplifier 23 which drives a gate 26 for coupling induced voltages in winding 22 to output terminals 27 for utilization.

A circuit 28 couples an additional output from pulser 18 through a timing circuit 24 to gate 26 for opening that gate to transmit signals to terminal 27 only during a predetermined portion of each of the output pulses from pulser 18. The reason for the gating will be subsequently discussed.

A permanent bar magnet 29 is provided for writing in information to be stored in divec 10. Magnet 29 is mounted upon a movable card 30 which may, in appropriate applications, include additional similarly situated permanent magnets so that write-in may be simultaneously performed in a number of devices. Magnet 29 extends through card 30 so that its two poles appear on opposite sides thereof. For convenience in the drawing, the two poles of magnet 29 have been designated "1" and "0" to facilitate an association between the corresponding magnetic pole polarities of magnet 29 and the common designations of ONE and ZERO for the two different types of information bits in a binary coded information system. Magnet 29 must display at its poles a magnetic field of sufficient intensity to substantially saturate rung 13 in one or the other of the remanent magnetic conditions defined by its hysteresis loop.

It is, of course, apparent from the orientation of device 10 and magnet 29 in FIG. 1 that when magnet 29 is brought sufficiently close to device 10 to magnetize the rung 13, the portion of the field close to the pole of magnet 29 will also magnetize the portion of rail 16 which interconnects rungs 12 and 13 in a direction which tends to oppose the magnetization of rung 13. These two magnetization paths are schematically indicated by the broken lines in the drawing indicating generally the return flux paths between poles of magnet 29. The presence of opposed magnetizations has been found to produce no untoward effects, the net magnetization being the factor of primary significance. Magnet 29 is moved into proximity with rung 13 by movement of card 30 in any convenient manner. Manual movement is schematically indicated by a hand 25 in the drawing.

Pulser 18 operates continuously and magnet 29 may be moved up to and away from the rung 13 for writing in information even though pulser 18 is operating. However, once information has been stored in device 10, the presence of magnet 29 is not required for further operation until it is desired to change the stored information. The switching of flux in rungs 11 and 12 of device 10 does not adversely affect the write-in operation so pulser 18 need not be turned off during writing. Additional circuit means are provided for blanking the output at terminals 27 during a write-in operation and for a short interval thereafter to prevent the write-in transients from reaching the output.

The movements of card 30 are interlocked with an inhibit input connection 31 on amplifier 23 to provide the aforementioned blanking operation. This interlock is schematically represented by a switch rod 32 which has a contact-closing extension 32*a*. When card 30 is positioned as illustrated with magnet 29 in proximity to rung 13, contact 32*a* completes a circuit to activate a blanking timer 33 for applying a signal to the inhibiting input connection 31 so that amplifier 23 is prevented from operating. Timer 33 may be any of the known timing circuits for providing the inhibiting signal while contacts 32*a* are closed and for a predetermined interval after they are opened.

Upon completion of the write-in operation, card 30 is moved downward away from device 10 thereby causing the contacts 32*a* to open the previously established input connection to timer 33. Timer 33 is adapted, as previously noted, to maintain an inhibit signal at connection 31 for a predetermined time interval after the removal of magnet 29 away from device 10 has begun. This is of sufficient duration to permit removal of magnet 29 to a sufficient distance so that it no longer influences any part of device 10. Upon the termination of that time interval, timer 33 automatically enables amplifier 23 once more so that flux changes in rung 13 appear as voltage variations at output terminals 27 after being coupled through gate 26.

Figure 2:
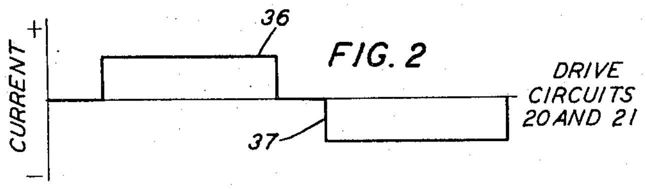
FIG. 2 is a diagram of typical drive current pulses which are utilized in connection with the operation of the circuit of FIG. 1.

FIG. 2 shows two successive current drive pulses 36 and 37 as they appear in the input windings 20 and 21, respectively. These pulses are of opposite polarity with respect to one another so that they switch substantially all of the flux in rung 11 in opposite directions between the remanent flux conditions of the rung.

Figure 3A:
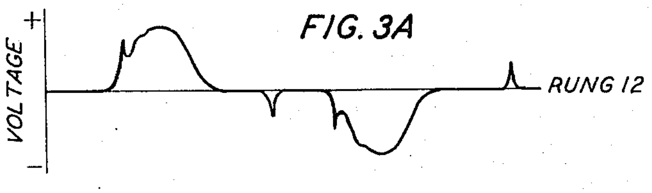
FIGS. 3A, 3B, and 3C are output signal waveforms illustrating the operation of the invention.

FIG. 3A shows the induced voltage waveforms observed experimentally in a winding (not shown) coupled to rung 12. These waveforms indicate that a substantial flux is being switched in rung 12 along with the switching of flux in rung 11. They also show that flux switching in rung 12 is completed well before the end of the correspond driving current pulse, and takes place in a direction which is a function of the drive current polarity, but requires an interval which is much longer than the drive pulse rise time.

Figure 3B:
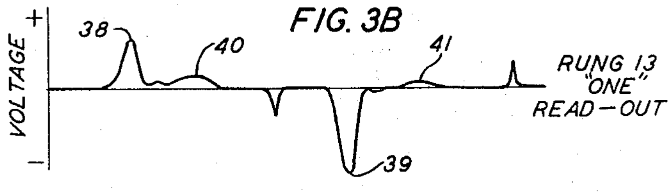

FIG. 3B shows the induced voltage in winding 22 during interrogation when a ONE is stored in rung 13. The initial portion of each drive current pulse produces in winding 22 a dipulse, or dual-peaked, type of induced voltage. It should be noted at this point that although the dipulses for positive and negative drive current pulses have some similarities, they are of substantially different configuration.

The dipulses of FIG. 3B have a configuration similarity in that the initial pulse peaks 38 and 39 in the dipulses occur during the initial portions of the drive current pulses 36 and 37, respectively, shown in FIG. 2; and each of the peaks 38 and 39 is of a polarity which corresponds to the corresponding drive current pulse polarity. These initial voltage pulse peaks are quite similar to the rate of flux change waveform for what has been designated in the art as a reversible flux change. Such flux change is considered reversible in the thermodynamic sense because it apparently represents a flux change which occurs in one polarity in substantial coincidence with the leading edge of the drive signal and in the opposite polarity in substantial coincidence with the trailing edge of the drive pulse, but with no substantial dissipation of energy in either case.

It will be further noted from the waveforms of FIG. 3B that the initial pulse peak 38 of the first dipulse corresponding to the positive drive current pulse 36 is of much lower magnitude than the initial pulse peak 39 of the second dipulse which corresponds to the negative-going drive current pulse 37. This is one of two principal distinctions between the dipulse configurations. Since the mentioned peak magnitude difference prevails through repeated interrogation cycles with no further write-in, it suggests that when a ONE is stored in device 10, rung 13 has a substantially lower permeability to flux generated by the positive-going drive pulse than it does for flux generated by the negative-going drive pulse. Rung 13 appears, therefore, on the basis of these waveforms, to display a nonreciprocal permeability. It is further noted in connection with FIG. 3B that the second pulse peaks 40 and 41 of the two dipulses are of the same polarity and that polarity is the same as the polarity of the smaller initial dipulse peak 38. This is the second one of the two principal differences in the configuration of the two dipulses of FIG. 3B. These two differences suggest that there is a connection between the aforementioned nonreciprocal permeability and the polarity of the second peak of each dipulse.

Figure 3C:
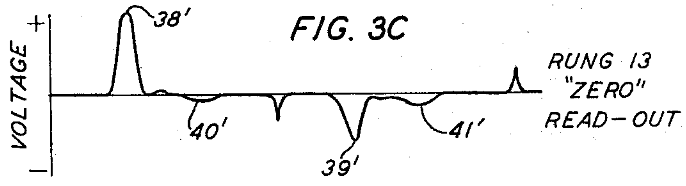

The waveforms of FIG. 3C were obtained by reversing magnet 29 on card 30 to write a ZERO in rung 13 and then observing the output on winding 22 which is indicated in FIG. 3C. The latter figure shows now that the second peaks 40′ and 41′ of the two dipulses are of the same polarity as the initial peak 39′ of the dipulse produced by the negative drive current pulse. The last-mentioned initial peak is also the smaller of the two initial peaks. If a ONE is written in rung 13 again the output of FIG. 3B appears again. Accordingly, the polarity of the second peaks of the dipulses generated by flux changes in rung 13 in response to flux changes in rung 11 is a function of the initial magnetization polarity of rung 13.

FIGS. 3B and 3C are drawings of oscilloscope traces showing the superposition of many thousands of interrogations. The virtually complete registration of the traces in each case for thousands of cycles of interrogation by alternating switching pulses applied to rung 11 shows that there is no apparent diminution in the output signal over repeated cycles of interrogation with no additional write-in.

Since the time interval spanned by the initial pulse excursion in each dipulse of FIGS. 3B and 3C is very nearly the same, the timing network 24 injects delay in circuit 28 to prevent the opening of gate 26 until such initial pulse peak has substantially subsided. Thus, only the second pulse peak of each dipulse appears at terminals 27; and the polarity of signals observed at output terminals 27 is, therefore, a function of the polarity of the write-in magnetization in rung 13. Of course, gate 26 could be made amplitude sensitive and opened during peaks 38 and 38' to produce a pulse output for ZERO only. In the latter case network 24 is simply a rectifier.

In summary, the magnetic storage network of FIG. 1 may have binary information stored in one branch of device 10, for example by card changeable permanent magnets, and may be repeatedly interrogated on a different rung to produce small flux changes in rung 13 without destroying the information stored in rung 13. Induced output signals produced in a sense winding on rung 13 have a characteristic which is indicative of the polarity of the binary information stored in rung 13.

Although the present invention has been described in connection with a particular embodiment thereof, it is to be understood that this is intended to be only an illustration of the principles involved and that additional applications and embodiments which will be apparent to those skilled in the art are included within the spirit and scope of the invention.

What is claimed is:

1. A magnetic storage element comprising
   a two-hole magnetic device of ferrite material having a substantially rectangular hysteresis characteristic defining two stable remanent flux conditions, said device having two outer and one inner rung portions interconnecting two side rail portions to define the apertures thereof, all of said rung and rail portions having substantially the same flux path cross sectional area,
   means initially magnetizing a first one of said outer rung portions to a predetermined polarity,
   means switching substantially all of the magnetic flux in the second one of said outer rung portions back and forth between its two stable conditions, and
   means sensing flux changes in said first outer rung portion and producing a corresponding electrical output signal.

2. The magnetic storage element in accordance with claim 1 in which said sensing means includes means disabling the output from such sensing means during the initial portion of each flux switch in said second rung.

3. A magnetic storage circuit comprising
   a flux-limited two-aperture device of magnetic material having substantially rectangular hysteresis characteristics, a first one of the apertures of said device being defined by a first long magnetic path and a short magnetic path, the second one of the apertures being defined by a second long magnetic path and by said short path,
   means magnetizing a portion of said second long path to a predetermined polarity,
   means alternately switching flux around said first aperture in different directions, and
   means deriving output signals from said second long path during flux switches around said first aperture.

4. A magnetic storage device comprising
   a two-aperture magnetic element having substantially rectangular hysteresis characteristics,
   means inducing in one portion of said element partially defining one aperture thereof a nonreciprocal permeability with respect to flux changes initiated in a different portion of said element, said permeability having a smaller magnitude for flux of a polarity which is indicative of the initial magnetization polarity of said one portion than for flux of the opposite polarity, and
   means sensing flux changes in said one portion.

5. A magnetic storage element comprising a two-aperture magnetic device of ferrite material, said device having two side rail portions and three interconnecting rung portions defining the apertures thereof, each of said portions having a substantially rectangular hysteresis characteristic,
   means applying to one of said rung portions and an adjacent rail portion partially defining one of said apertures magnetic fields in opposite directions about such aperture for at least partially magnetizing such rung and rail portions to corresponding opposite remanent flux conditions,
   means switching a second rung of said device back and forth between the two remanent flux conditions defined by said characteristic, and
   means sensing flux changes in said one rung.

6. A magnetic information storage element comprising
   a two-aperture magnetic device having first, second, and third interconnected branches of uniform cross sectional area defining the apertures thereof, each of said branches having a substantially rectangular hysteresis characteristic defining two stable conditions of magnetic remanence, only said third branch being common to both apertures,
   permanent magnet means magnetizing a portion of said first branch to a predetermined polarity,
   means repeatedly applying an alternating interrogation signal to said second branch for switching said second branch back and forth between its two stable conditions, each half-cycle of said interrogation signal being of sufficient magnitude to produce a two-peaked rate of flux change in said first branch, and
   an output circuit electromagnetically engaging said first branch for producing an output signal which is indicative of said predetermined polarity.

7. A magnetic circuit for information storage, said circuit comprising
   a magnetic device having first, second, and third interconnected branches, each branch having substantially the same magnetic path cross sectional area and rectangular hysteresis characteristics,
   means premagnetizing a portion of said first branch to a predetermined polarity,
   means applying recurring bipolar interrogation signals for switching said second branch around its hysteresis characteristic, said signals being of sufficient magnitude also to cause partial switching of flux in both of said first and third branches as a result of switching in said second branch, and
   means deriving from said first branch unipolar output signals with a polarity corresponding to said predetermined polarity.

References Cited by the Examiner

UNITED STATES PATENTS

| | | | |
|---|---|---|---|
| 2,918,661 | 12/1959 | Tong C. Chen et al. | 340—174 |
| 2,994,067 | 7/1961 | Rajchman | 340—174 |

JAMES W. MOFFITT, *Acting Primary Examiner.*

G. LIEBERSTEIN, *Assistant Examiner.*